United States Patent
Ben-Itzhak et al.

(10) Patent No.: US 8,769,690 B2
(45) Date of Patent: Jul. 1, 2014

(54) PROTECTION FROM MALICIOUS WEB CONTENT

(75) Inventors: Yuval Ben-Itzhak, Brno (CZ); Gregory Andrew Mosher, Marietta, GA (US)

(73) Assignee: AVG Netherlands B.V., Amsterdam (NL)

(*) Notice: Subject to any disclaimer, the term of this patent is extended or adjusted under 35 U.S.C. 154(b) by 23 days.

(21) Appl. No.: 12/833,425

(22) Filed: Jul. 9, 2010

(65) Prior Publication Data

US 2011/0030058 A1    Feb. 3, 2011

Related U.S. Application Data

(63) Continuation-in-part of application No. 11/691,094, filed on Mar. 26, 2007.

(60) Provisional application No. 60/785,723, filed on Mar. 24, 2006.

(51) Int. Cl.
| | | |
|---|---|---|
| G06F 21/00 | (2013.01) | |
| G06F 21/55 | (2013.01) | |
| G06F 21/51 | (2013.01) | |
| G06F 21/56 | (2013.01) | |
| H04L 29/06 | (2006.01) | |

(52) U.S. Cl.
CPC .............. *G06F 21/51* (2013.01); *G06F 21/566* (2013.01); *H04L 63/1408* (2013.01); *G06F 21/55* (2013.01); *G06F 2221/2119* (2013.01); *H04L 63/1483* (2013.01); H04L 63/1441 (2013.01); *G06F 21/56* (2013.01); H04L 63/168 (2013.01); H04L 63/166 (2013.01); H04L 63/1416 (2013.01)

USPC ................................ 726/24; 726/22; 709/224

(58) Field of Classification Search
CPC ............ H04L 63/1408; H04L 63/1483; G06F 2221/2119; G06F 21/566; G06F 21/554
USPC ....................... 726/22–25; 709/224
See application file for complete search history.

(56) References Cited

U.S. PATENT DOCUMENTS

| | | |
|---|---|---|
| 5,623,600 A | 4/1997 | Ji et al. |
| 7,093,121 B2 | 8/2006 | Barton et al. |

(Continued)

FOREIGN PATENT DOCUMENTS

| | | |
|---|---|---|
| JP | 2001256045 | 9/2001 |
| JP | 2003-182166 | 7/2003 |

(Continued)

OTHER PUBLICATIONS

Huang et al, "A testing framework for Web application security assessment", Computer Networks, vol. 48, issue 5, pp. 739-761 (avialable online Feb. 12, 2005).*

(Continued)

*Primary Examiner* — Jung Kim
*Assistant Examiner* — Theodore Parsons
(74) *Attorney, Agent, or Firm* — Kramer Levin Naftalis & Frankel LLP

(57) ABSTRACT

Instructions allowing their recipient to access content via a computer network are intercepted at a destination device sending the instructions via a host-server. Content of an instruction is analyzed at the destination device for malicious components, and results of the analysis are associated with the content prior to being presented to viewers of the content.

31 Claims, 6 Drawing Sheets

(56) References Cited

U.S. PATENT DOCUMENTS

| | | | |
|---|---|---|---|
| 7,096,500 B2* | 8/2006 | Roberts et al. | 726/24 |
| 7,107,618 B1 | 9/2006 | Gordon et al. | |
| 7,266,843 B2 | 9/2007 | Tarbotton et al. | |
| 7,472,422 B1* | 12/2008 | Agbabian | 726/25 |
| 7,552,196 B2 | 6/2009 | Levi et al. | |
| 7,603,699 B2 | 10/2009 | Abdulhayoglu | |
| 7,636,943 B2 | 12/2009 | Gruper et al. | |
| 7,640,586 B1* | 12/2009 | Johnson et al. | 726/24 |
| 7,673,341 B2 | 3/2010 | Kramer et al. | |
| 7,849,502 B1* | 12/2010 | Bloch et al. | 726/11 |
| 7,865,953 B1* | 1/2011 | Hsieh et al. | 726/22 |
| 8,356,352 B1* | 1/2013 | Wawda et al. | 726/22 |
| 2002/0016925 A1 | 2/2002 | Pennec et al. | |
| 2003/0048468 A1 | 3/2003 | Boldon et al. | |
| 2003/0079142 A1* | 4/2003 | Margalit et al. | 713/200 |
| 2003/0097591 A1* | 5/2003 | Pham et al. | 713/201 |
| 2003/0131249 A1 | 7/2003 | Hoffman | |
| 2004/0148281 A1 | 7/2004 | Bates et al. | |
| 2004/0193915 A1* | 9/2004 | Smith et al. | 713/200 |
| 2004/0210769 A1 | 10/2004 | Radatti et al. | |
| 2005/0005160 A1* | 1/2005 | Bates et al. | 713/200 |
| 2005/0138432 A1* | 6/2005 | Ransom et al. | 713/201 |
| 2006/0101514 A1* | 5/2006 | Milener et al. | 726/22 |
| 2006/0212930 A1 | 9/2006 | Shull et al. | |
| 2007/0039053 A1* | 2/2007 | Dvir | 726/24 |
| 2008/0133639 A1 | 6/2008 | Panasyuk et al. | |
| 2008/0229416 A1 | 9/2008 | Stewart et al. | |
| 2008/0229419 A1 | 9/2008 | Holostov et al. | |
| 2008/0244724 A1 | 10/2008 | Choe et al. | |
| 2009/0064335 A1 | 3/2009 | Sinn et al. | |
| 2009/0070873 A1* | 3/2009 | McAfee et al. | 726/23 |
| 2009/0106840 A1 | 4/2009 | Dreymann et al. | |
| 2009/0193074 A1 | 7/2009 | Lee | |
| 2009/0217370 A1 | 8/2009 | Hulten et al. | |
| 2009/0248696 A1 | 10/2009 | Rowles et al. | |
| 2009/0249484 A1* | 10/2009 | Howard et al. | 726/24 |
| 2009/0282483 A1 | 11/2009 | Bennett | |
| 2009/0282485 A1* | 11/2009 | Bennett | 726/24 |
| 2009/0287653 A1 | 11/2009 | Bennett | |
| 2009/0293126 A1 | 11/2009 | Archer et al. | |
| 2009/0307769 A1 | 12/2009 | Curnyn | |
| 2010/0017880 A1* | 1/2010 | Masood | 726/24 |
| 2010/0043072 A1 | 2/2010 | Rothwell | |
| 2010/0162393 A1* | 6/2010 | Sobel et al. | 726/23 |
| 2011/0197281 A1* | 8/2011 | Alme et al. | 726/24 |
| 2013/0024935 A1* | 1/2013 | Kolingivadi et al. | 726/22 |

FOREIGN PATENT DOCUMENTS

| | | |
|---|---|---|
| JP | 2007-323674 | 12/2007 |
| WO | WO-02/44862 | 6/2002 |

OTHER PUBLICATIONS

Avira GbmH, "Avira AntiVir Premium User Manual", see p. 72 (2011).*

* cited by examiner

PROTECTION FROM MALICIOUS WEB CONTENT

CROSS-REFERENCE TO RELATED APPLICATIONS

This application is a continuation in part of and claims priority to and the benefits of co-pending U.S. patent application Ser. No. 11/691,094, entitled "Software Vulnerability Exploitation Shield", filed on Mar. 26, 2007, which itself claims priority to and the benefits of U.S. provisional patent application Ser. No. 60/785,723, filed on Mar. 24, 2006, the entire disclosures of which are incorporated herein by reference.

FIELD OF THE INVENTION

The invention relates generally to online security, and, more specifically, the identification of malicious content on the world-wide web.

BACKGROUND

As the popularity of social-networking websites such as Facebook and MySpace continues to grow, many webhosts now display user-generated content and/or links to third-party content on the websites they host. In a typical scenario, a webhost designates a website to a user, and the user provides the content to be displayed at the designated website. The content can include text, audio, and video data, and instructions to access content located at one or more content sources. For example, the instructions can include a uniform resource locator (URL) link to a news article or to a restaurant review posted on a different website. The visitors to the user's website, typically the user's friends and acquaintances, but also strangers in some situations, can view and/or download the displayed content. They can also follow the links in the instructions to other content sources, and access content provided by those sources. In this way, a user can share his or her knowledge, information, and sources of entertainment with the user's friends and others.

Not all uses of such functionality are benign, however. Instances in which a user uploads malicious content such as a computer virus or malware on to the designated website are well documented. Some users also provide links to sources configured to infect a visitor's computer with malicious content—sometimes purposefully, and other times unknowingly. When a visitor accesses the uploaded content or identified site, the malicious content can cause harm to the visitor's computer or mobile device. For example, a virus may be downloaded onto the visitor's computer and may destroy the visitor's data. In other instances, a malware program may be covertly installed and, without authorization from the visitor, track her on-line activities.

One way a visitor to another person's webpage can protect himself is by installing commercially available virus/malware protection software. Such software typically detects malicious components in files being downloaded onto the visitor's computer and prevents the download and/or alerts the visitor of the presence of the malicious component. Some malicious components, however, may go undetected by the virus/malware protection software. Moreover, this method requires an Internet user to actively purchase, install and maintain the most up-to-date version of a virus/malware protection software. If such a program is not installed, or is disabled—not an uncommon practice among many Internet users—virtually no protection is available to the visitor.

Even if the most up-to-date virus/malware protection software is used, it only inspects files being downloaded, and does not inspect an electronic source (e.g., a webpage) associated with a link supplied by a third party. Such a webpage can be a phishing site (i.e., an unauthorized website masquerading as a different, authorized website). A visitor to a malicious content provider's website may unsuspectingly follow a link to a phishing website, and may unintentionally reveal his or her personal information to an unauthorized party. A virus/malware protection software typically cannot provide protection in this situation.

Another way to provide protection to visitors is to employ a scanning service to scan web pages on the Internet. This service can detect websites containing malicious components and/or phishing websites, and may report the detected websites, but usually cannot remove or disable such websites. Unless a visitor checks the report generated by such a service prior to visiting a webpage, either manually or automatically, the user is not protected from exposure to a malicious webpage. In addition, a website designated by a host to content provider is commonly password protected and although visitors registered with the host can visit the designated website, it cannot be scanned by a scanning service. As a result, the scanning service does not offer substantial protection to the visitors of the protected website.

Finally, scanning services typically run only periodically, leaving a visitor vulnerable to exposure to recently uploaded malicious content. For example, a content provider may upload malicious content to his or her designated webpage. A person visiting the designated webpage soon thereafter, before a scanning service has scanned the designated webpage, would expose himself or herself to the malicious content. Thus, the scanning service generally does not provide real-time protection to visitors. Therefore, there is a need for improved systems and methods for providing protection to Internet users from malicious content present at sites accessible to them.

SUMMARY OF THE INVENTION

In various embodiments of the present invention, protection is provided to visitors of web pages and viewers of online content. This is achieved, in part, by monitoring user-initiated instructions to access content at an electronic source. The content is scanned by the sender's device before the instructions, links, or other embedded content are submitted to a host server and later displayed to potential site visitors. Scanning may include determining whether the content contains a computer virus or malware, appropriate text, and may also include determining whether the electronic source is an unauthentic, phishing website.

In some instances, the portions of the scanning process may also be performed by components residing on a host server or provided by a third-party service interacting with client-resident scanning components. The electronic source may be a host server operated by a third-party, or, in some cases, may be the client node operated by the user sending the instructions. The client-resident scanning components may incorporate attributes of the scan results in the submitted instructions and/or embedded content for use by the components residing on the host server in further inspection. These attributes may include the scanning engine identity, user identity, scan results, and/or any other attribute that can be valuable to the host server.

If the scanned content is deemed safe, an indication identifying it as such is associated with the content and can be presented to potential viewers of the content. Additionally, or in the alternative, if the content is deemed unsafe, the content and/or any of its components (e.g., a link) are marked as unsafe, alerting potential visitors of the presence of potentially harmful content. Because the monitoring and scanning operations may performed solely by the sender device, even instructions to access limited-access (e.g., password-protected) websites can be monitored and marked as unsafe if the sources accessible using these instructions are determined to be harmful. A visitor can choose not to access the likely harmful content, and hence, her computer remains protected from the content.

A link in the provided instructions can also be replaced with an alternate link, and the alternate link displayed to or otherwise communicated to the visitor. When the visitor clicks on the alternate link, content at the source associated with the replaced link is scanned. Only if the scanned content is determined to be safe the visitor is directed to that source. One advantage of this technique is that the content source which the visitor expects to visit is inspected for malicious components substantially immediately before the visit, thereby ensuring that the source is safe at the time of the visit.

Accordingly, in one aspect, a method for analyzing content for malicious components includes monitoring, at a sender device, a submission of electronic instructions. Content referenced in the instructions (either at a destination node or included the instructions) is accessed in response to the submitted instructions. The content is scanned for one or more malicious components to obtain a scan result and, based on the scan result, an indicator associated with the content indicating whether the content is deemed to be safe is presented with (and/or, in some cases, added to) the content.

In some embodiments, the sender device sends the electronic instructions and the steps of monitoring, scanning, and presenting are performed by the sender device. In other embodiments, the sender device sends the electronic instructions and the steps of scanning and/or presenting are performed by a server. The sender device may also send the scanning results to the server for further scanning of the content, the scan results or both. The electronic instructions may include an instruction to visit a destination link, an instruction to view a multimedia file, and/or the content itself.

The destination node (e.g., where the content ultimately resides) can be a content server, the sender device, a bulletin board service, a publicly accessible electronic content source, a repository and/or a database. In some embodiments, the instructions are posted at a host-server, which may also be a content server, a bulletin board service, and/or a publicly accessible electronic content source. In some cases the destination node itself may be the host-server.

The content may include text data, audio data, image data, user-generated content, video data, and/or a link to content, and the presenting step may include displaying the content and the associated indicator in a webpage, an email, or a text message.

According to a second aspect, a method is provided for analyzing content for malicious components, including monitoring, at a sender device, a submission of electronic instructions to access content. The instructions include a destination link to content at a destination node. The method also includes replacing the destination link with an alternate link, and presenting the alternate link to potential viewers of the content. In response to the viewer's request to access content associated with the alternate link, content at the destination link and associated with the alternate link is scanned for one or more malicious components, a scan result is obtained, and the viewer is directed to the content at the destination link.

In some embodiments, the monitoring and replacing steps are performed by the sender device and the scanning and directing steps are performed by a host-server to which the instructions are posted. The host-server may be a content server, a bulletin board service, and/or a publicly accessible electronic content source. The destination node can be a content server, a bulletin board service, a publicly accessible electronic content source, a repository, and a database. The destination node can also be a host-server where the instructions are posted.

The electronic instructions may include an instruction to visit a webpage, an instruction to view a multimedia file, and/or the content, and the content may include text data, audio data, image data, video data, instructions to a computer, and/or a link to content. In some embodiments, the presenting step includes displaying the alternate link in a webpage.

According to a third aspect, a system for analyzing content for malicious components includes a client device configured to facilitate electronic communications among individuals. The client device includes a monitor for monitoring submissions of electronic instructions to access content and a scanner to scan the content for one or more malicious components. Upon scanning the content, the scanner produces a scan result. The client device also includes a presenter for adding an indicator based on the scan result to be associated with the content when presented to potential viewers of the content.

In some embodiments, the destination node is a content source, which can be a publically accessible electronic content source. The scanner can include a computer-virus scanner and/or a malware scanner.

According to a fourth aspect, a system for analyzing content for malicious components includes a sender device that includes a monitor for monitoring electronic instructions to access a destination node. The instructions include a destination link to content at the destination node. The sender device also includes a presenter for presenting an alternate link associated with the destination link.

The system further includes a host-server that includes a scanner to scan content at the destination node for one or more malicious components. When a user requests access to content associated with the alternate link, the scanner produces a scan result. A director, included in the host-server, directs the user to the content at the destination node according to the scan result, e.g., when the scanner determines that the content is not harmful.

In some embodiments the destination node comprises a content source, and the content source may include a publically accessible electronic content source. The scanner may include a computer-virus scanner and/or a malware scanner. In some embodiments, the sending device also includes a scanner to scan content at the destination node for one or more malicious components to obtain a scan result and a presenter for presenting the destination link and an indicator associated with the destination link. The indicator is based on the scan result, and may indicate whether the content is determined to be safe.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
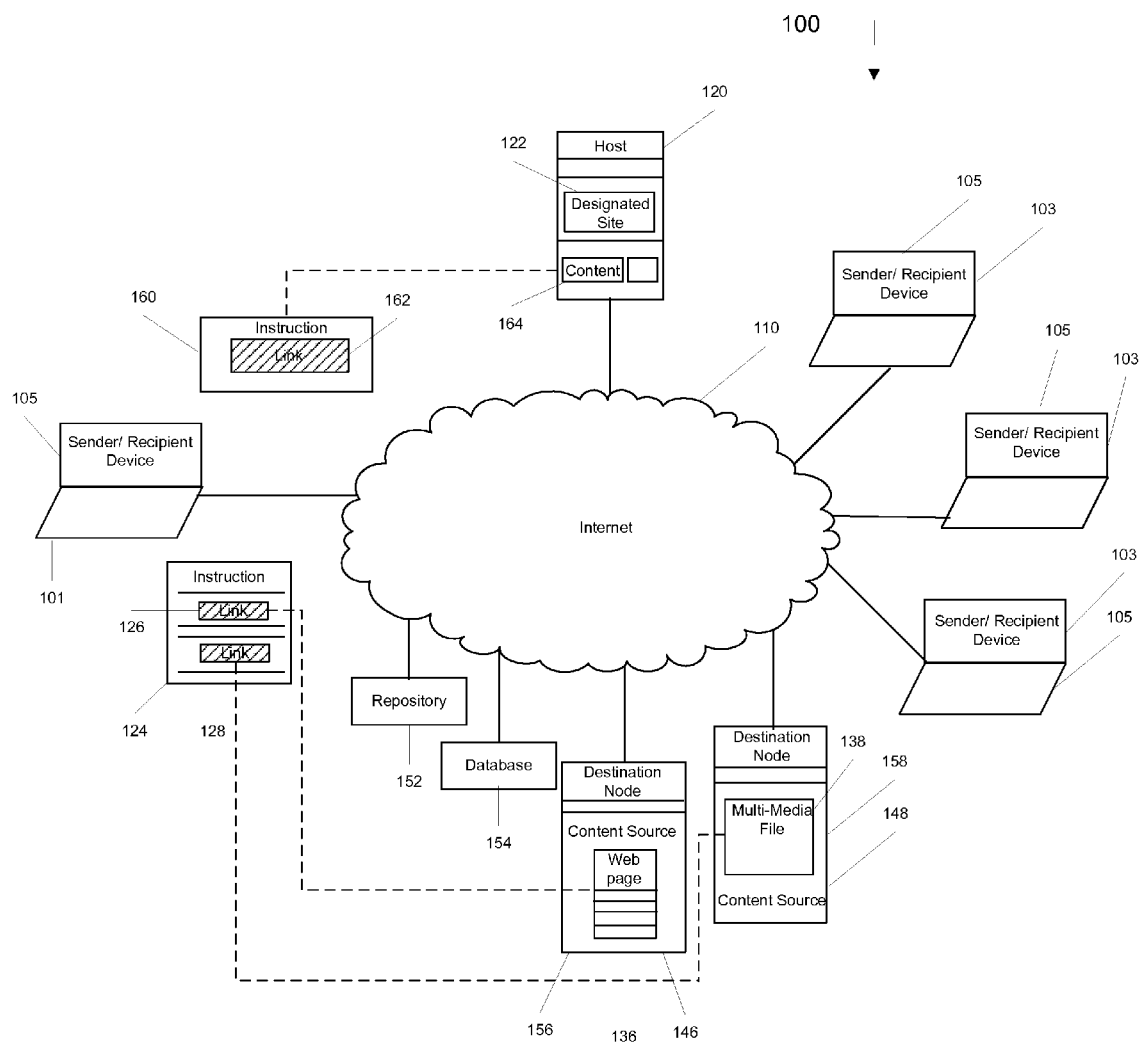
FIG. 1 schematically depicts a social-networking system.

Referring to FIG. 1, a social-networking system 100 in which various embodiments of the invention may be implemented includes nodes 101, 103 having communication devices 105 located at each of the nodes 101, 103 for facilitating communication among users of the system 100. Although FIG. 1 shows laptop and desktop computers as communication devices 105, these are illustrative only and other devices such as cell phones, smart phones, netbooks, wireless devices, and/or personal digital assistants (PDAs) are also within the scope of the invention. The communication devices 105 are connected to a communication network 110 (e.g., a private network, a local-area network, a wireless network, the Internet, etc.).

Users at nodes 101, 103 communicate with one another by sending and receiving electronic messages using the communication devices 105 and the network 110. An electronic message can be sent to a user and/or it can be posted on a site maintained by a host 120. The host 120 may, in some cases, designate a site to each registered user, and registered users can view some or all of the content posted on sites designated to other register users. Examples of such "designated sites" include an individual's Facebook "wall" or MySpace page. Users typically post information to such sites describing events in their lives, professional activities, photos, and links to general news items of interest. For example, the user at node 101 is designated a site 122 by the host 120. When the user at node 101 initiates or submits an instruction 124 (e.g., a message to view content or visit another node) to the user at node 103, the instruction 124 is sent to the user at nodes 103, who may view the instruction 124 on his respective communication devices 105. In other embodiments, the instruction 124 is displayed at the website 122, and in some cases may also trigger a message to the user 103 such as an email or text message to view the website 122. Other users (i.e., visitors) visiting the web site 122 can also view and follow the instruction 124 displayed at the site 122.

The instruction 124 may, in some cases, include a destination link 126 (typically an HTTP command comprising a URL) directing users to navigate to a webpage 136 hosted at a destination node 146. The destination node 146 may be a publically accessible electronic content source 156, a private content source, or, in some cases, a combination of public and private content stored on one or more servers. The instruction 124 may also include a destination link 128 to a multi-media file 138 provided by a content source 158 located at the destination node 148. The user at node 101 can also send instructions to access other sources of content such as a repository 152, to which users submit content and access content provided by other uses, a database 154, and/or a bulletin-board service (BBS) provider. For example, the instruction 160 includes a destination link 162 to the content 164 stored by the host 120 that may also be a BBS provider, although a BBS provider can be distinct from the host 120.

The repository 152, the database 154, the publically accessible electronic content source 156, the content source 158, and the host 120 are connected to the communication network 110. A visitor viewing the site 122 can follow the destination links 126, 128, and 162 presented or otherwise displayed in instructions 124, 160 by, for example, selecting the link from within a web browser application, a text message, an email or other electronic communication. When a visitor selects the link 126, the visitor's communication device 105 is directed to the destination node 146, whereupon the visitor can access the webpage 136. However, without any warning, the visitor's communication device 105 may be infected by harmful components (e.g., computer viruses, scripts, malware, phishing schemes, etc.) that may be present in the content accessed at the webpage 136. Using the techniques and systems described herein, The visitor can be protected substantially from such components.

Figure 2:
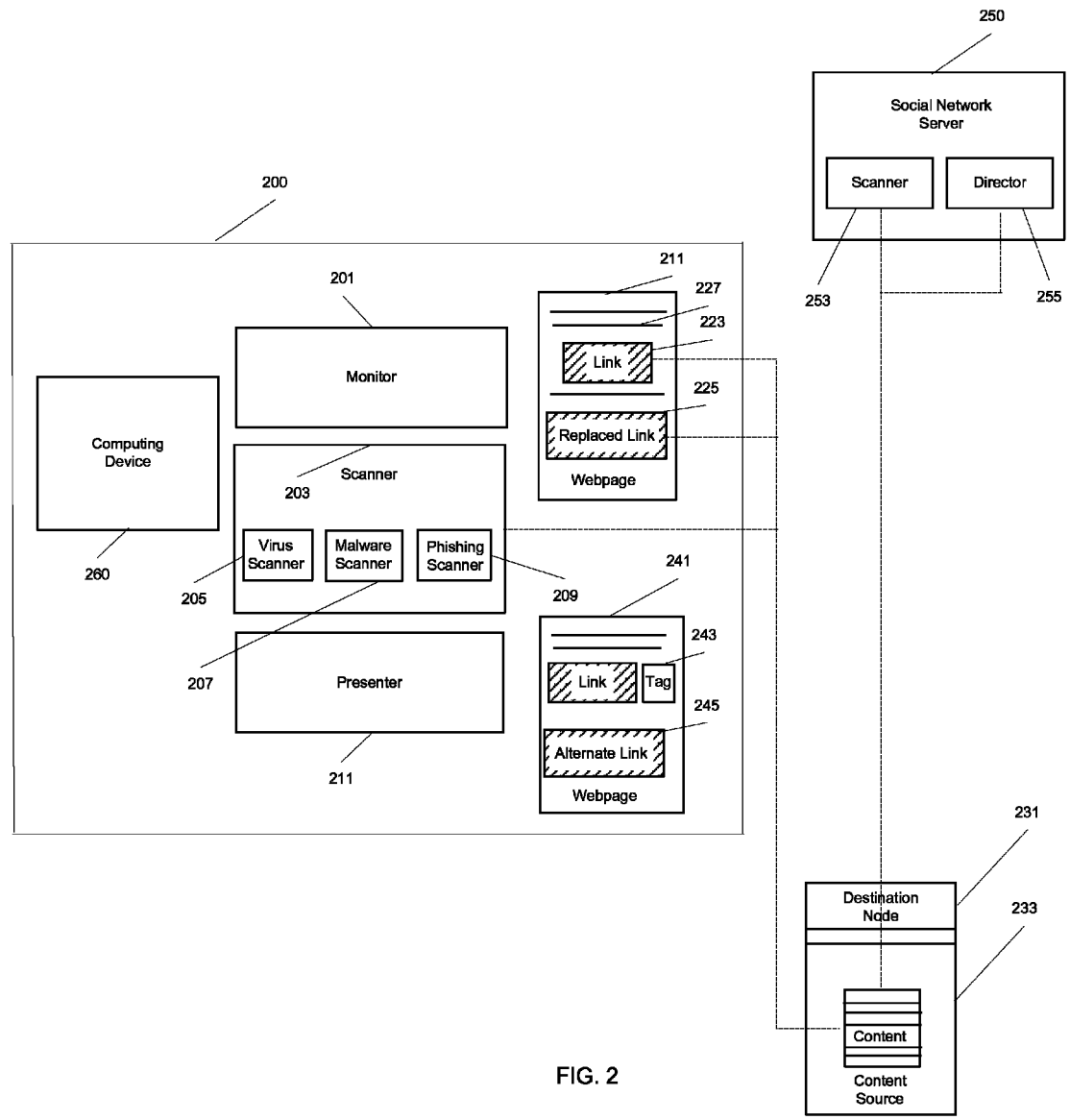
FIG. 2 schematically depicts an embodiment of a monitoring/scanning system according to the present invention.

According to various embodiments of the invention, and referring to FIG. 2, a user initiates the submission of instructions to other users (i.e., potential visitors) using a computing device 260 included in a sender device 200. The instructions may include a request to view or visit benign content, as well as potentially harmful sites or content. These instructions are monitored by the monitor 201, residing on the user's sender device 200.

The monitor 201 intercepts and analyzes a submission 221 instructing visitors to access content from a content source 231 prior to the instruction being made available to visitors. In one particular case, the submission 221 may include instructions to view content 227 and/or to visit destination links 223, 225 directing the visitor to the content source 231. For example, the instructions may not include actual links to content, but instead direct the visitors to view a graphics file, an audio file, or review text, which may, in some cases, be included in the instructions. It should be understood that the submission 221 as illustrated includes two links 223, 225 but that submissions including fewer (i.e., only one) or more links are within the scope of the invention. Moreover, although the links 223, 225 are associated with the destination node 233 where the content source 231 is located, each link in an instruction can be associated with a different destination node, a different content source, and/or different content 227.

In one implementation, the monitor 201 identifies content 227 in the submission 221, and the scanner 203, also residing at the sender device 200, scans the content. In other instances, the scanner 203 follows links 223, 225 included in the submission 221 and scans the content at the destination node 233 (i.e., content provided by the content source 231) associated with the links 223, 225. The scanner 203 may include a virus scanner 205 and a malware scanner 207 that scan the accessed content for viruses and malware, respectively. The scanning can be performed sequentially or concurrently. The scanner 203 may also include a phishing scanner 209 that determines whether the destination node 233 is authentic, i.e., it does not display a phishing website masquerading as some other website.

In other embodiments of the present invention, a sending device may include only one or two scanners. For example, a sending device may include only the virus and malware scanners 205, 207, respectively, or only the phishing scanner 209. Typically, the scanner 203 comprises the most up-to-date versions of the scanners 205, 207, 209, providing visitors protection from the latest known threats. In some embodiments, the scanner also detects and executes script files (e.g., javascript) present on the destination node 233 to determine if the scripts perform any unwanted functions such as keyboard logging, redirection, or initiating messages without the permission of the viewing user.

If the scanner 203 determines that the content 227 included in the submission 221 and/or the content associated with the link 223 is safe, the submission 221 is annotated with a tag 243 indicating that the content is "safe." In some cases, the presenter 211 creates a webpage 241 hosted by a host/server 250, displaying the submission 221. A tag 243 indicating that the content associated with the link 223 is safe is displayed with the link 223 in the webpage 241. The tag 243 may be a visual icon indicating the link 223 is safe to visit, or in other cases the tag 243 may be text describing the scanning process (i.e., "this link has been inspected and found to be safe."). Should the scanner 203 determine that the scanned content is not safe, the tag 243 can be configured to indicate to the visitor that the content associated with the link 223 is not safe.

Once the monitor 201 has identified all the content 227 and/or the destination links in the submission 221, the presenter 211 may, in some embodiments, replace the destination link 225 with an alternate link 245, and display the alternate link 245 in the webpage 241. The replaced link 245 informs the user of the destination node 233 and the content source 231 associated with the replaced node 223. At a certain time, a visitor viewing the webpage 241 may request access to the content source 231, e.g., by clicking on the alternate link 245. In response, the scanner 253, located at the host/server 250, retrieves the replaced link 225 corresponding to the alternate link 245, and scans the content associated with the replaced link 225 (i.e., content provided by the content source 231) as described above.

If the scanner 253 determines that the scanned content is safe, the director 255 directs the visitor to the destination node 223, allowing the visitor to access content provided by the content source 231. If, on the other hand, the scanner 253 determines that the scanned content is not safe, the director 255 does not direct the visitor to the content source 231; instead, a warning may be displayed alongside the content in the webpage 241 indicating that the content associated with the link 225 may be harmful.

Even if the instructions sent from the sender device 200 are posted on a password-protected website (not shown) hosted by a host/server 250, and/or are viewable only by other users registered with the host/server 250, by monitoring and scanning the instructions and potential destination sites at the sender device 200, prior to being sent to other users, the system can analyze instructions to which the access is limited. In some embodiments, the system can also use passwords or user IDs of the user sending the instructions to access the protected sites.

In addition to using the computing device 260 for sending instructions, as described above, in some embodiments the computing device 260 may be used to create the content to which the user is directing visitors. The computing device 260 may also be used to execute computer instructions provided by the monitor 201, the scanner 203, and/or the presenter 211.

Figure 3:
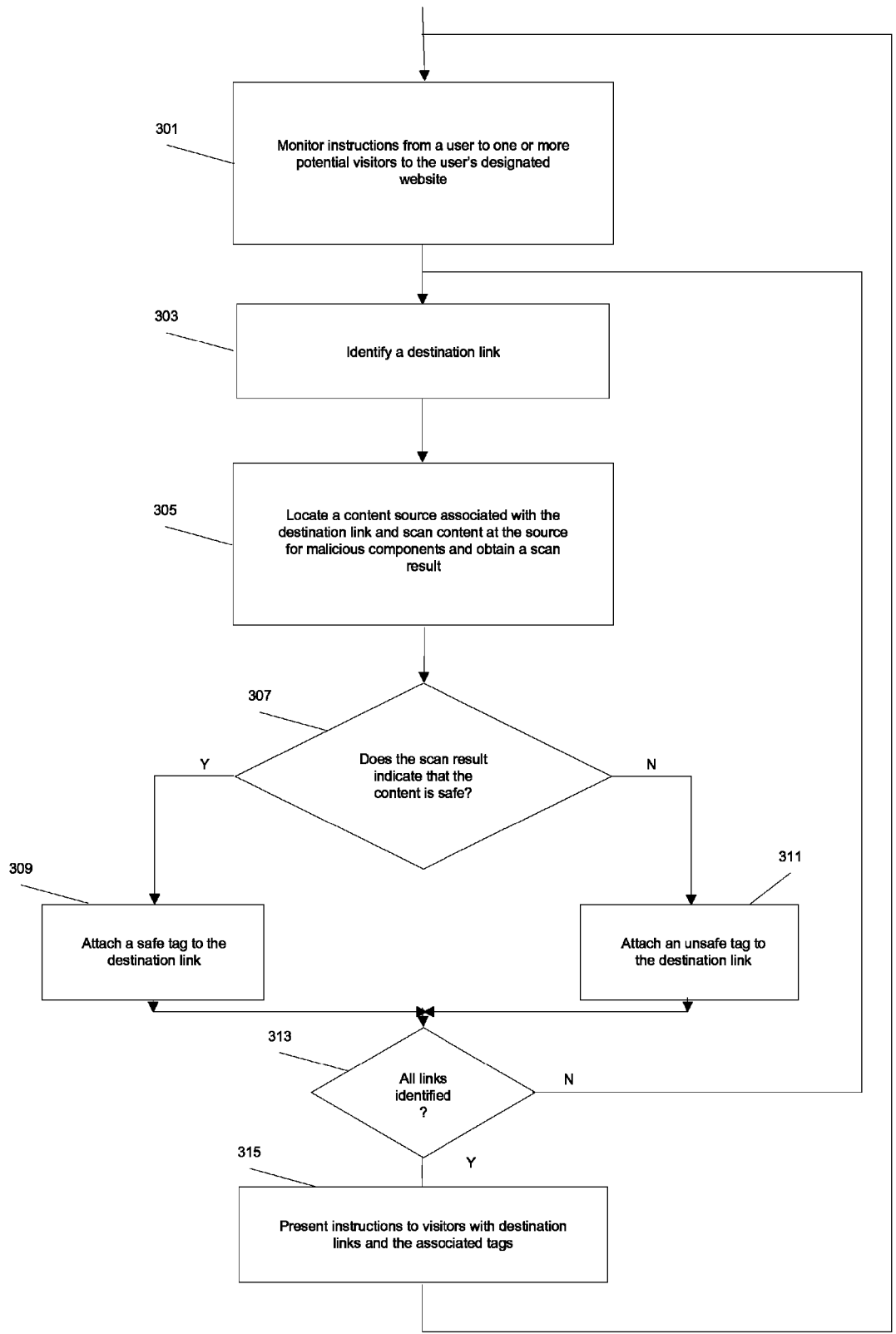
FIG. 3 shows a flow diagram of the steps performed in tagging the destination links in the instructions sent by a user, according to one embodiment of the invention.

One embodiment of a process for scanning content is illustrated with reference to FIG. 3. In step 301, a submission of instructions from a user to potential visitors to the user's designated site or to view content provided by the user are monitored. These instructions typically include instructions to access content in a message (e.g., an email), to view content at a content source located at a destination node and/or providing or identifying a link to the destination node, such that by clicking on the link, a visitor is directed to content provided by the content source at the destination node. In step 303, a destination link is identified, and steps 303-311 are repeated until all links in the instruction are identified and analyzed. In alternative embodiments in which the content is provided directly in the instructions (e.g., as an embedded multi-media file or text message) step 303 may be skipped and the content scanned directly as described below.

In step 305, the content source associated with the identified submission is located, and the content provided at the content source or in the submission itself is scanned for malicious components. The malicious components may include computer viruses, malware, unwanted scripts, and phishing websites. The scanning step can be configured to scan for only certain types of components (e.g., viruses and malware only), and can be configured to scan for additional types of harmful components such as adware, key-stroke logger, etc.

If the scanned content is determined to be safe in step 307, a tag indicating that the destination of the destination link is safe is attached to the content (if the content is sent directly to the visitor) or, in some cases, to the destination link in step 309. If the scanned component is determined to be harmful, a tag indicating that the destination may be harmful is attached to the destination link in step 311. It should be understood that while FIG. 3 illustrates attaching both types of tags, only one type of tag (e.g., a tag indicating that the destination may be harmful) may be attached. In such a system, a user presumes that the content associated with a destination link is safe, unless a tag indicating otherwise is attached to the link.

After determining in step 313 that all links in the instruction have been identified and analyzed in steps 303-311, instructions including the destination links and the tags associated with the links are presented to potential visitors in step 315. The presentation can be accomplished, for example, by displaying the instructions in a webpage hosted by a server or as a pop-up message in the visitor's communication device, etc. The visiting user is then free to decide whether to follow the instructions from the user and access the content, or avoid the content. In either case, the visitor is provided valuable information about the safety and security of the content without needing anti-virus or malware detection software on their client device. Monitoring of other instructions from all users continues in step 301, and the remaining steps are repeated as necessary.

In some embodiments, the results of the scan may be stored in scan repository, either at the user's computing device, the host/server, a third-party storage service, or some combination of each. In such instances, the results may be used to identify trends, new threats, or frequent offenders (i.e., users that repeatedly post links to harmful content). In some cases, the scan data may be anonamized and/or aggregated to protect the identity of the users and/or visitors that generated the scan data.

Figure 4:
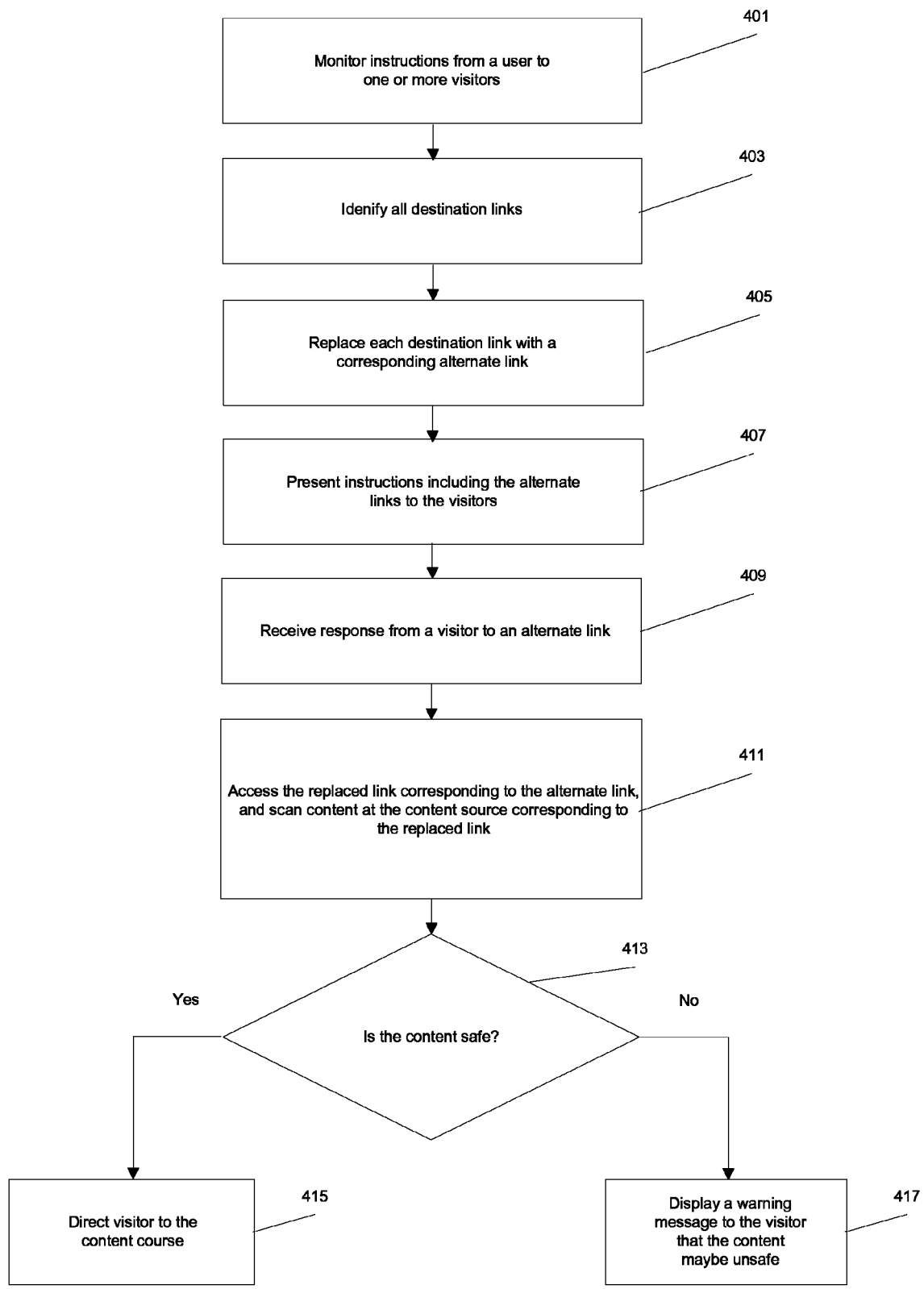
FIG. 4 shows a flow diagram of the steps performed in providing alternate links and directing a visitor to a content source, according to one embodiment of the invention.

Referring now to FIG. 4, instructions from one user directing other users (i.e., visitors) to access content at one or more content sources are monitored in step 401. The instructions typically include directions to visit one or more destination links, as described above. After identifying each destination link in step 403, the links are replaced with respective alternate links in step 405. The instructions including the alternate links are the presented to the content visitors in step 407. The examples of presentation include display in a webpage designated to the user sending the instructions, or display in a pop-up window on the visitor's computer, or display of a message on the visitor's cell phone, etc.

In step 409, a response is received based on the visitor navigating to the alternative link. Typically, the visitor responds by clicking on the alternate link, thereby requesting content associated with the replaced link but now corresponding to the alternate link. In step 411, in response to a visitor's request, the replaced link associated with the alternate link is accessed, and the content associated with the replaced link is scanned for harmful components in a manner similar to that described above with references to FIGS. 2 and 3. If the scanned content is determined to be safe in step 413, the visitor is directed to the destination node (i.e., content source) associated with the replaced link in step 415. Otherwise, in step 417, a warning message is provided to the user that the content may be unsafe, and the visitor is not directed to such content. The warning may be presented to the user as an icon alongside the link to the harmful content, or displayed as a pop-up warning, text message, or other means of communicating such a warning to the user.

As described above, the content is scanned in step 411, using scanning systems and software, substantially immediately prior to directing a visitor to the content source in step 415. The most up-to-date systems are typically aware of the most recently discovered harmful components, and provide protection from such components. Therefore, the visitor can be substantially certain that the content available at the destination node is safe at the time at which the visitor is accessing that content. This service can be provided to a site visitor without having to require either the sender of the instructions or the visitor following these instructions to install and run malware or virus detection systems.

Figure 5:
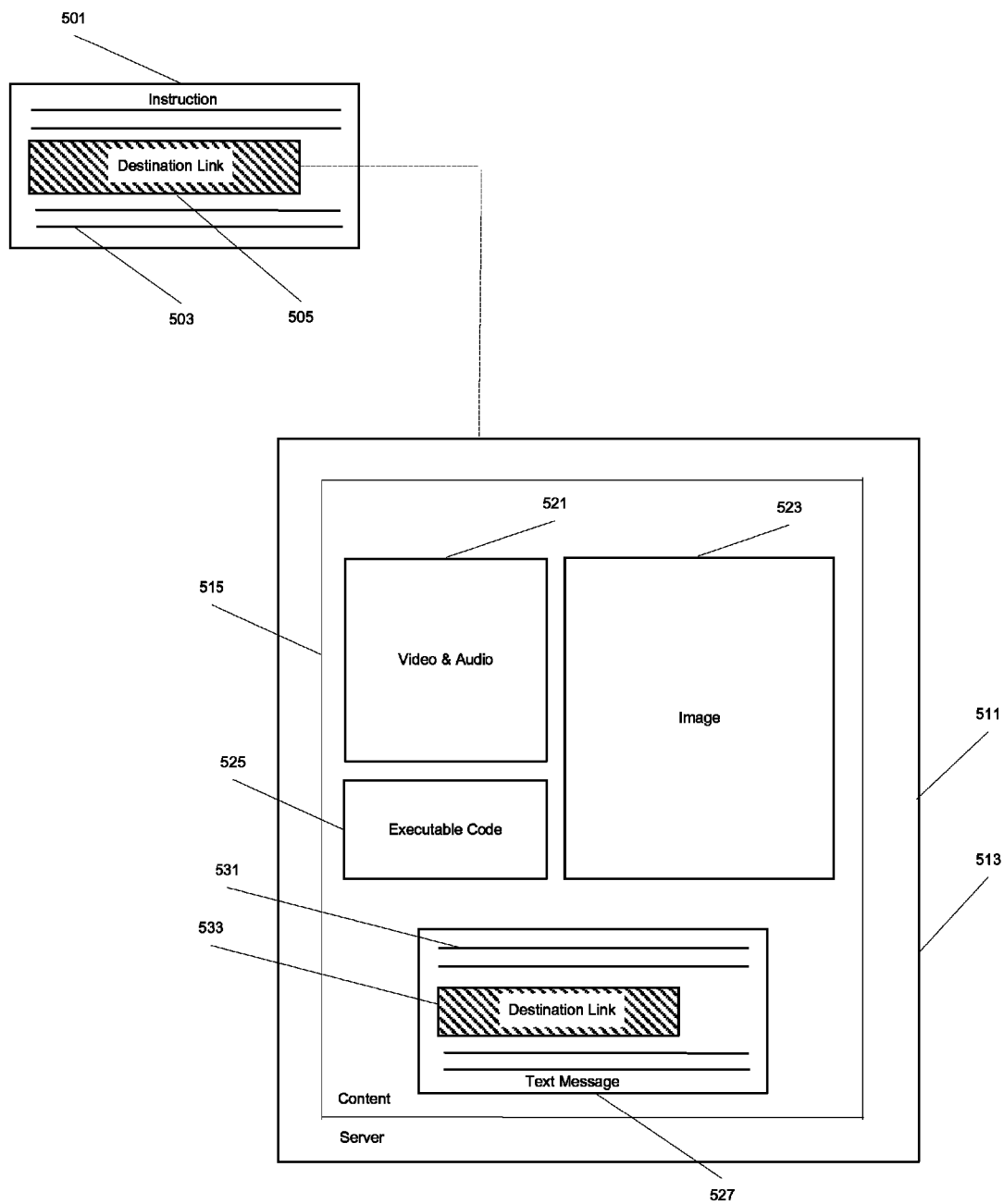
FIG. 5 schematically depicts exemplary content provided by a content server.

Various types of content can be scanned using systems and methods according to embodiments the present invention. For example, FIG. 5 shows an instruction 501 including a text component 503 and a destination link 505 associated with a destination node 511. A content server 513 that provides content 515 to users accessing the content server 513 is located at the destination node 511. In this example, the content 515 includes video and audio content 521 and an image 523. While the audio/video content 521 includes both the audio and video components, the content 515 may include each of these components individually. The audio/video content can be a movie clip, a sports clip, a news clip, a lecture, and/or other multimedia presentations.

The content 515 may also include executable code 525 (e.g., a Java application, a script, XML code, other instructions executable by a computer, etc.). A user may create such code to perform a useful task such as accounting or organizing multi-media content, and may share it with other users in a social network. Upon accessing the content server 513, a visitor may download the executable code 525 and run it on his or her computer.

The content 515 may also include a text message 531 including ordinary text 531 and a destination link 533. The text message 531 can also be an instruction to access content from another source accessible using a destination link 533. It should be understood that the content provided by a content server 513, in general, may include different types of content in various combinations (e.g., the text message 527 and image 523 only, or the text message 527 and the executable code 525 only). Moreover, the content can include more than one of each types of content (i.e., text, audio, video, image, executable code, instructions, and combinations thereof).

Figure 6A:
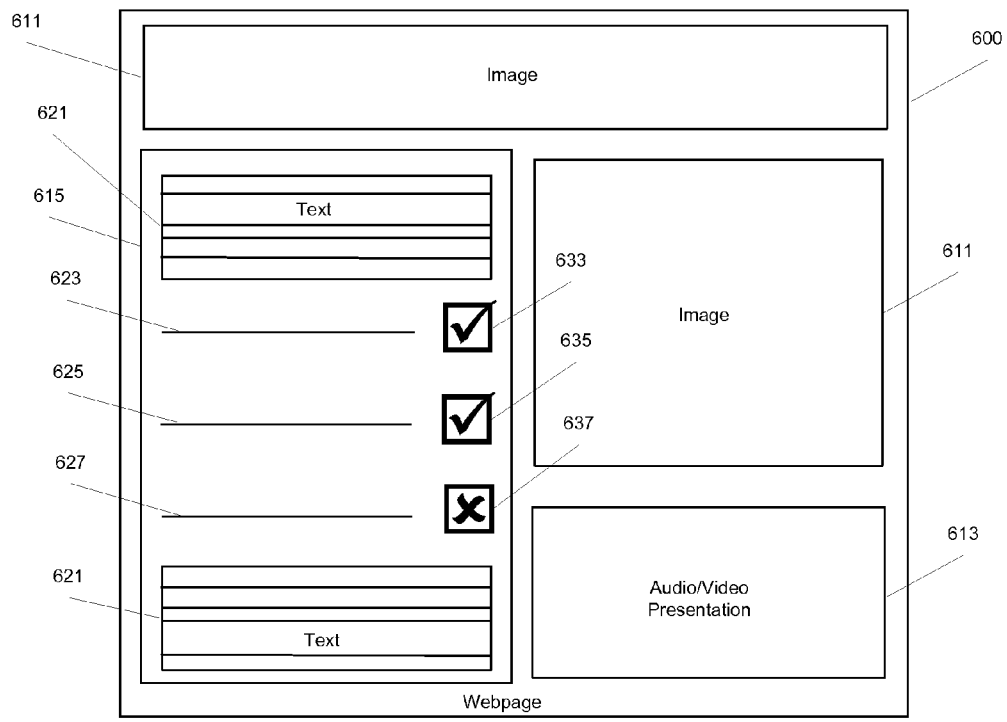
FIGS. 6A and 6B show web pages as displayed to a visitor, the web pages showing tagged and alternate links, respectively.

As described above, after the instructions are intercepted and analyzed at the sending device, the processed instructions may be presented to visitors, for example, in a webpage. The webpage 600 shown in FIG. 6A contains images 611 and an audio/video presentation 613. The webpage 600 also includes a processed instruction 615. The instruction 615 includes ordinary text components 621 and destination links 623, 625, 627. The links 623, 625 have tags 633, 635 associated with the links, respectively. Tags 633, 635 indicate that it is safe to access the content at the destination node associated with the destination links 623, 625. On the other hand, the tag 637, associated with the link 627, indicates that the content at the destination node associated with the link 627 may be unsafe. A visitor viewing the webpage 600 may decide not follow the link 637 and thus, he or she is substantially protected from the likely harmful components present at the destination of link 627 without having to rely on any anti-virus or malware detection software on their computer or hand-held device.

Figure 6B:
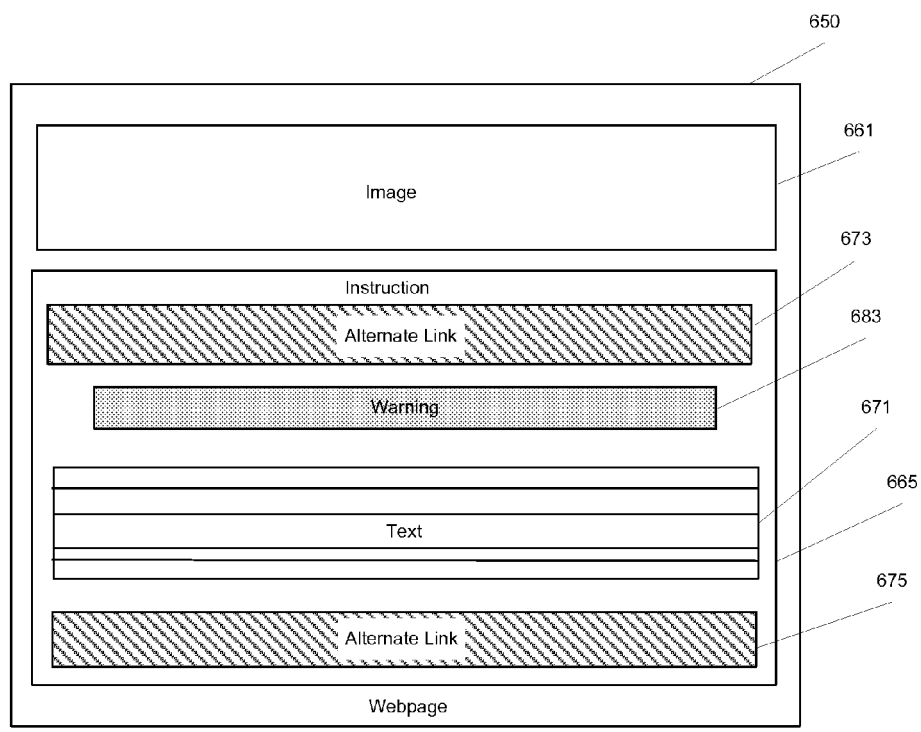

The webpage 650, shown in FIG. 6B also includes an image 661 and an instruction 665. The instruction 665 includes a text component 671 and alternate links 673, 675. If a visitor clicks on the alternate link 673, the host/server first determines, as described above with reference to FIG. 4, whether content at the destination node associated with the link (not shown) to which the alternate link 673 corresponds is safe. If the content is determined to be safe, the visitor is directed to the destination node. Otherwise, a warning 683 alerts the visitor that the content he or she requested may be unsafe. The visitor is not directed to the destination node, and is thus protected substantially from the potentially harmful content.

Each functional component described above may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A method for analyzing content for malicious components, the method comprising:
    monitoring, at a sender device, a submission of electronic instructions to access content, wherein the monitoring comprises identifying content based at least in part on the instructions, the submission being performed by a first user and being directed to a host-server, and the instructions being directed to a second user;
    scanning, using a data processing device at the host server, the content identified from the monitoring step for one or more malicious components to obtain a scan result prior to the second user receiving the instructions; and
    presenting an indicator associated with the content, wherein the indicator is based on the scan result.

2. The method of claim 1, wherein the sender device sends the electronic instructions and the steps of monitoring and presenting are performed by the sender device.

3. The method of claim 1, wherein the electronic instructions comprise an instruction to visit a destination link.

4. The method of claim 1, wherein the electronic instructions comprise an instruction to view a multimedia file.

5. The method of claim 1, wherein the electronic instructions comprise the content.

6. The method of claim 1, wherein the electronic instructions comprise a destination node, and wherein the destination node is selected from a group comprising a content server, a bulletin board service, a publicly accessible electronic content source, a repository, and a database.

7. The method of claim 1, wherein the instructions are posted at the host-server, and the host-server is selected from a group consisting of a content server, a bulletin board service, and a publicly accessible electronic content source.

8. The method of claim 7, wherein the electronic instructions to access content comprises a destination node and wherein the destination node is the host-server.

9. The method of claim 7, wherein the sender device sends the electronic instructions and the step of presenting is performed by the host-server.

10. The method of claim 1, wherein the content comprises at least one of text data, audio data, image data, user-generated content, video data, and a link to content.

11. The method of claim 1, wherein the presenting step comprises displaying the content and the associated indicator in a webpage.

12. A method for analyzing content for malicious components, the method comprising:
    monitoring, at a sender device, a submission of electronic instructions to access content, the submission being performed by a first user and being directed to a host-server designating a site to the first user, wherein the monitoring comprises identifying content based at least in part on the instructions, and wherein the instructions are directed to a second user and comprise a destination link to content at a destination node;
    replacing, at the sender device, the destination link identified during the monitoring step with an alternate link;
    presenting, by the host-server, the alternate link;
    in response to a request by the second user to access content associated with the alternate link, scanning, using a data processing device, content at the destination link associated with the alternate link for one or more malicious components to obtain a scan result; and
    directing the second user to the content at the destination link in response to the scan result.

13. The method of claim 12, wherein the scanning and directing steps are performed by the host-server.

14. The method of claim 12, wherein the host-server is selected from a group consisting of a content server, a bulletin board service, and a publicly accessible electronic content source.

15. The method of claim 12, wherein the electronic instructions comprise an instruction to visit a webpage.

16. The method of claim 12, wherein the electronic instructions comprise an instruction to view a multimedia file.

17. The method of claim 12, wherein the electronic instructions comprise additional content, the method further comprising scanning the additional content.

18. The method of claim 12, wherein the destination node is selected from a group consisting of a content server, a bulletin board service, a publicly accessible electronic content source, a repository, a database, and the host-server, the instructions being posted at the host-server.

19. The method of claim 12, wherein the content comprises at least one of text data, audio data, image data, video data, instructions to a computer, and a link to content.

20. The method of claim 12, wherein the presenting step comprises displaying the alternate link in a webpage.

21. A system for analyzing content for malicious components, the system comprising:
    a sender device configured to facilitate electronic communications, via a host-server, among a first user who is associated with the sender device and a second user, the sender device further comprising:
        a monitor for monitoring electronic instructions to access content instructions to access content, the instructions being directed to the second user, wherein the monitor is configured to identify content associated with the submission;
        a presenter for presenting an indicator associated with the content wherein the indicator is based on the scan result, and wherein the presenter replaces a destination link to the content with an alternate link;
    the system further comprising:
        a scanner, at the host server, to scan the content identified by the monitor for one or more malicious components to obtain a scan result before the second user receives the instructions.

22. The system of claim 21, wherein the content is stored at a content source destination node.

23. The system of claim 22, wherein the content source comprises a publically accessible electronic content source.

24. The system of claim 21, wherein the scanner comprises a computer-virus scanner.

25. The system of claim 21, wherein the scanner comprises a malware scanner.

26. A system for analyzing content for malicious components, the system comprising:
    a sender device for submitting electronic instructions to access content to a host-server designating a site to a first user associated with the sender device, the instructions being directed to a second user, the sender device comprising:
        a monitor for monitoring submissions of electronic instructions to access content, wherein the monitoring comprises identifying content based at least in part on the instructions, and wherein the instructions comprise a destination link to the content at a destination node; and
        a presenter for presenting an alternate link associated with the destination link identified by the monitor; and
    a host-server designating a site to the first user, the host-server comprising:
        a first scanner to scan content at the destination node for one or more malicious components to obtain a scan result, in response to the second user requesting access to content associated with the alternate link; and
        a director to direct the second user to the content at the destination node in response to the scan result.

27. The system of claim 26, wherein the destination node comprises a content source.

28. The system of claim 27, wherein the content source comprises a publically accessible electronic content source.

29. The system of claim 26, wherein the scanner comprises a computer-virus scanner.

30. The system of claim 26, wherein the scanner comprises a malware scanner.

31. The system of claim 26, wherein the sending device further comprises:
  a second scanner to scan content at the destination node for one or more malicious components to obtain a second scan result, and
  the presenter is configured for presenting an indicator associated with the alternate link, wherein the indicator is based on the second scan result.

* * * * *